United States Patent [19]
Russo

[11] Patent Number: 5,731,020
[45] Date of Patent: *Mar. 24, 1998

[54] DISCRETE WAFER ASSEMBLED COOKIE AND METHOD OF MAKING SAME

[76] Inventor: Peter J. Russo, 150 Rockland Rd., Guilford, Conn. 06437

[*] Notice: The term of this patent shall not extend beyond the expiration date of Pat. No. 5,500,234.

[21] Appl. No.: 603,425

[22] Filed: Feb. 20, 1996

[51] Int. Cl.[6] ................................................. A23G 1/00
[52] U.S. Cl. .......................... 426/104; 426/94; 426/112; 426/119; 426/120
[58] Field of Search ........................... 426/94, 112, 119, 426/120, 104

[56] References Cited

U.S. PATENT DOCUMENTS

| | | | |
|---|---|---|---|
| 2,007,261 | 7/1935 | Stover | 426/119 |
| 4,194,300 | 3/1980 | Swanson et al. | 34/217 |
| 4,560,562 | 12/1985 | Schroeder | 426/104 |
| 4,733,863 | 3/1988 | Novotny | 426/112 |
| 4,943,063 | 7/1990 | Moreau | 426/104 |
| 4,948,602 | 8/1990 | Boehm | 426/94 |
| 5,017,394 | 5/1991 | MacPherson et al. | 426/30 R |
| 5,500,234 | 3/1996 | Russo | 426/103 |

*Primary Examiner*—Ana Fortuna
*Attorney, Agent, or Firm*—Lawrence Hager

[57] ABSTRACT

A food product comprising a plurality of preformed discrete wafers being selectively assembled by the consumer into a multi-layer cookie or snack having desired layers of edible food product such as a potato chip or corn chip, etc. with one or more selectable intermediate layer(s) or filler substances such as chocolate, peanut butter spread, etc. disposed between the outer cookie/chip layers. The preformed and packaged layers enable the snack food item to be selectively assembled and arranged by the consumers to suit his/her individual taste and to enable the consumers to experiment with multiple sandwich/cookie constituent ingredient combinations/arrangements.

12 Claims, 3 Drawing Sheets

5,731,020

DISCRETE WAFER ASSEMBLED COOKIE AND METHOD OF MAKING SAME

FIELD OF THE INVENTION

The present invention relates to food products and so-called snack foods and, more particularly, to a multilayered cookie like product wherein intermediate discrete preformed filler layers may be selectively used between the outer chip or cookie layers to form a selective variety of different combinations of said layers. This invention also relates to educational aid devices and particularly to a food product/device that can be utilized as an educational device which enables self-taught association between an object and, for example, its identifying name or symbol or shape.

BACKGROUND OF THE INVENTION

This invention relates in general to a food product and more particularly, to a snack type food. In the past several years, a plenteous variety of cookies and other type snack foods have been introduced in the market place.

In addition, various types of potato, corn, rice and oat chips, etc. have been formulated and prepared by, for example, deep frying to obtain a crispy texture.

For example, the preparation of dough from which potato chips can be made has been previously disclosed by Markakis et al in U.S. Pat. No. 3,027,258; by Hilton in U.S. Pat. No. 3,109,739; by Schaul in U.S. Pat. No. 2,469,995, by Succo et al in U.S. Pat. No. 3,493,390, by Koshida et al in U.S. Pat. No. 4,279,932 and by d'Arnaud et al in U.S. Pat. No. 3,220,852.

It is noted that such crispy products, in particular potato chips, are not used to form a sandwich snack with any intermediate filler containing oils, and/or moisture such as chocolate, peanut butter spreads, coconut, etc. because the crispy potato chip hitherto would quickly absorb the oils and/or moisture and become soggy.

Also, such prior art cookie snacks are pre-assembled into a single unified food item, which is in total contrast to the present invention that permits the end consumers to mix and match the cookies with a plurality of discrete intermediate filler wafer like layers.

Although many people do enjoy dipping crispy potato chips, corn chips and the like into peanut butter and/or chocolate etc., such food product combinations have not been provided in pre-packaged form because hitherto the crispy chips are known to become soggy within minutes after such dipping.

In total contrast to the prior art, the present invention provides both a method of substantially preventing a crispy chip such as potato chip from becoming soggy when used in a cookie or sandwich like arrangement including a filler food such as peanut butter and/or chocolate and/or jelly etc. In addition, the present invention provides a new and improved food product package which enables consumers selective combination of: a pair of spaced apart cookies or crispy chips with one or more intermediate layers of food items such as wafers of marshmallow and/or chocolate and/or peanut butter and/or jelly etc. The sandwich like arrangement is pressed together whereby the marshmallow may form an adhesive like layer between the crispy chips and the intermediate filler food or be of a firmer texture so as not to bond with the filler wafers. In this manner, it is noted that the wafered items do not degrade the crispy texture of the chips and/or cookies doing packaging, shipping and storage and each thereby maintains and provides their individualized and distinctive flavors. Also, in this manner the moisture and/or oils etc. contained within the filler wafer layers do not contaminate the chips and/or cookie and/or cracker constituent components doing storage and shipment.

A number of educational devices, particularly for children, have been proposed such as is described in U.S. Pat. No. 1,619,160 issued Mar. 1, 1927 to Herbert H. Steele, U.S. Pat. No. 3,303,580 issued Feb. 14, 1967 to Virginia L. Stinar, U.S. Pat. No. 3,455,035 issued Jul. 15, 1969 to Jack L. Breneman and U.S. Pat. No. 4,045,884 issued Sept. 6, 1977 to Frances Lee Land and U.S. Pat. No. 4,146,977 issued to Maryhannah S. Barberi, and U.S. patent application Ser. No. 08/318,084 filed Oct. 5, 1994 by Peter Russo and now U.S. Pat. No. 5,500,234.

Typically, these devices require complicated mechanical and electrical mechanisms for actuating its informational display. The complexity and cost of such devices generally necessitate limiting or dedicating use of the device to that of an educational aid. Another problem which may be encountered by use of these prior art devices is that of child rejection due to association of the device only as an educational (work) device.

Typically, the prior art devices also require instructional guidance, correction, supervision and (frustrating) trial-and-error actuation to utilize the device.

In contrast to the prior art, the present invention provides a food product and packaging/device having a simple, and relatively inexpensive method which combines the capabilities and advantages of both an educational device and a food snack-treat, enables manipulation and varied arrangement of its constituent components, is adapted for ease of use and provides feedback to enhance self-taught learning. In this manner, learning may be combined with fun and food enjoyment.

Generally speaking, in accordance with the invention, an educational device and/or food product is provided having a plurality of different layers and/or wafers and/or cookies/crackers each distinctive and independent, each mounted in a compartmentalized package or housing. Each wafer/cookie is disposed in column/compartment of like wafers to form a multiple of different selectable wafer items. Each wafer may have at least one pictorial representation and/or intelligence on its surface which may be associated or integrated with a coding scheme, for example, a color pattern, on said wafer. By aligning the correspondingly coded areas/items on the adjacent wafers, association between pictorial representations, objects, words, intelligence, symbols and food combinations having inter-relationship can thereby, be recognized and developed.

SUMMARY OF THE INVENTION

A selective multilayered-wafer food product, in combination, comprising:
- one or more chips (11) and/or cookies and/or crackers;
- one or more discrete marshmallow (12) wafers preformed into one or more selective sizes and shapes each for being selectively juxtaposed with a side of said crispy chip and/or cookie and/or cracker;
- one or more discrete intermediate wafer layers of food (13–22) selected from the group consisting of substances generally known as peanut butter, chocolate, coconut, jelly, jams, candy, marmalades, syrups, fruits and extracts selectively disposed with said marshmallow and filler wafers.

A multi-item food product compartmentalized package, in combination, comprising:

a plurality of crispy chips (11) and/or cookies and/or crackers;

a plurality of discrete marshmallow (12) wafers preformed into one or more predetermined sizes and shapes; and a plurality of intermediate filler discrete wafer like layers of food (13) formed into one or more predetermined sizes and shapes selected from the group consisting of substances generally known as peanut butter, chocolate, coconut, jelly, jams, candy, marmalades, syrups, fruits and extracts, with each selected filler wafer being unified for being manually disposable with one or more of said marshmallow wafers and/or filler wafers to form a consumers selected united food product of discrete food wafer like layers.

A process of producing an improved multilayered type sandwich food product suitable for being packaged and shipped to retail stores substantially without degradation of the distinctive flavors and/or textures of the constituent components and for enabling many combinations of selected preformed wafer shaped food items, consisting of the steps of:

providing a compartmentalized box shape container;

inserting a plurality of cookies and/or crackers and/or crispy chips from the group consisting of potato chips, corn chips, rice cakes, oat crackers and wheat crackers etc. into selected compartments within said container;

forming a plurality of selected shaped and sized wafers or disc shaped marshmallow like food products each having a predetermined configuration such as in the form of animals or so-called silver dollars, each wafer or disc may by colored with a different food coloring to enhance the visual appearance and identify of the wafer figure and/or have surface characteristics for tactile and visual recognition;

inserting said marshmallow wafers or discs into selected compartment within said container;

forming a plurality of selected shaped and sized wafers and/or disc shaped intermediate filler food products selected from the group consisting of substances generally known as peanut butter, chocolate, coconut, jelly, jams, candy, marmalades, syrups, fruits and extracts each having a predetermined configuration such as in the form of animals or so-called silver dollars, each wafer or disc may by colored with a different food coloring to enhance the visual appearance and identity of the wafer figure and/or have surface characteristics for tactile and visual recognition, each filler wafer or disc is formulated and/or coated with an edible substance/coating formulated to permit and facilitate handling by the consumers to enable selective assortment and arrangement of the filler wafer(s) with one or more said marshmallow wafer(s) and/or said cookies and/or crackers;

inserting said intermediate filler food wafer products into selected compartments within said container;

providing a hermetically sealed packaging about said container.

OBJECTIVES OF THE INVENTION

It is an object of the present invention to provide a new and improved so-called snack food.

It is another object of the present invention to provide a new and improved sandwich type food product.

It is another object of the present invention to provide a new and improved filler type cookie.

It is another object of the present invention to provide a laminate food product containing one or more discrete manipulable wafer layers formulated to a firm or semi-firm consistency that will not disintegrate or dissolve or adhere to the fingers of the consumers with handling.

It is another object of the present invention to provide a plurality of crispy potato chips and/or cookies and/or crackers and a plurality of marshmallow wafers and a plurality of intermediate filler food wafers such as chocolate and/or peanut butter and/or jelly-jam and/or candy and/or coconut etc. in a containerized package to enable consumer assembly of a multiple of different layered/wafer snack food sandwich.

It is another object of the present invention to provide a filler snack type food which is designed to prevent to contamination between the constituent components of a layered snack food with packaging and storing on shelves.

It is an object of this invention to provide a new and improved educational and/or toy food product.

Another object of this invention is to provide a food product to enhance learning by identifying items having associative meaning.

A further object of this invention is to provide an educational/toy product which develops an awareness or sense of perspective, for example, for associating and/or grouping food items, symbols etc. of complimentary kind and for appreciating/recognizing the interrelationship between the items, indicia, symbols and food items.

A further object of this invention is to provide an food product which enables manipulation and/or varied arrangement of its constituent parts, e.g., its filler wafers, to thereby stimulate interest, exploration and food groupings.

A further object of this invention is to provide a snack food package educational device which enables self-taught recognition of food items having associative significance.

A further object of this invention is to provide an educational food device which enables food combination experimentation and self-correction by means of a color coding system.

A further object of this invention is to provide an educational food package device which utilizes visual and tactile association between food items having flavor associative significance.

A further object of this invention is to provide a food package which involves the systematic arrangement of different flavored discrete wafers of filler food such as jelly and/or fruit patties etc. identified by color and/or indicia.

BRIEF DESCRIPTION OF THE DRAWINGS

Other objects and advantages of the invention will be evident from the following detailed description; and like reference numbers refer to like items throughout.

DESCRIPTION OF THE PREFERRED EMBODIMENTS

Figure 1:
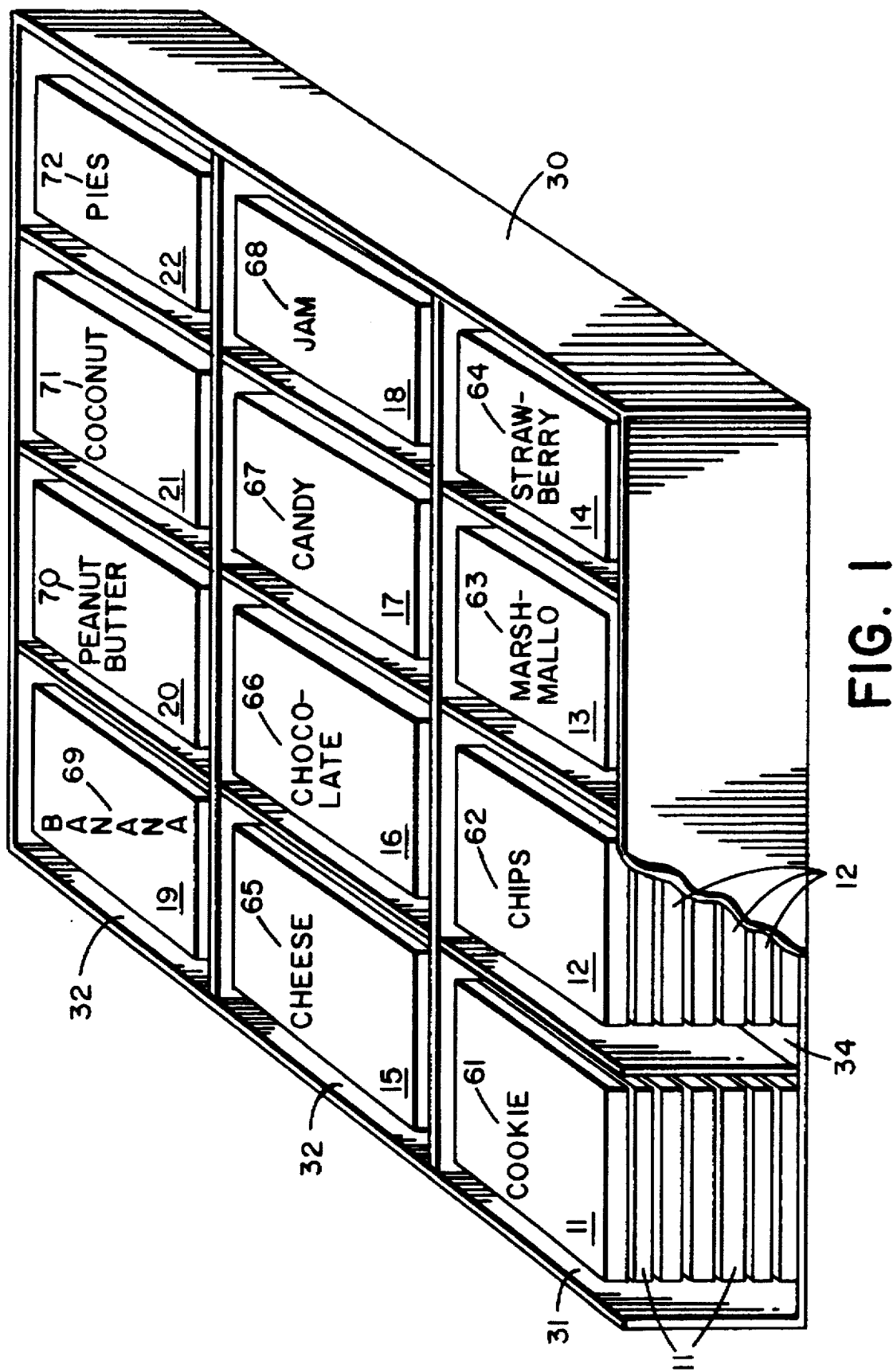
FIG. 1 is a perspective view, partially cut away, of a snack food package containing a variety of food patties or wafers formulated in accordance with the invention.
Figure 2:
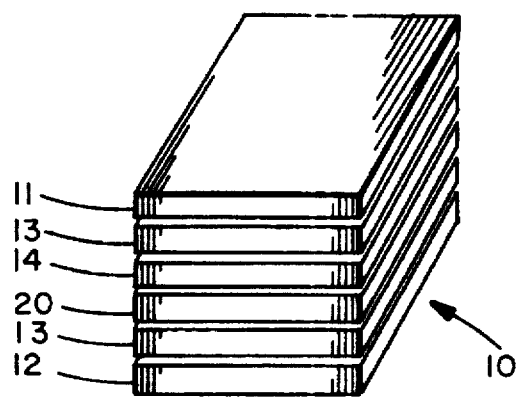
FIG. 2 is a perspective illustration of a possible snack food sandwich consumer selectable or formulated to from the compartmentalized food items shown in FIG. 1, in accordance with the invention.
Figure 3A:
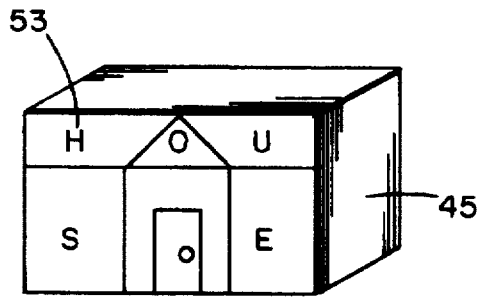
FIGS. 3A–3I are perspective illustrations of alternative embodiments of a plurality of different sized and shaped wafer like snack food items formulated in accordance with another feature of the invention.
Figure 3B:
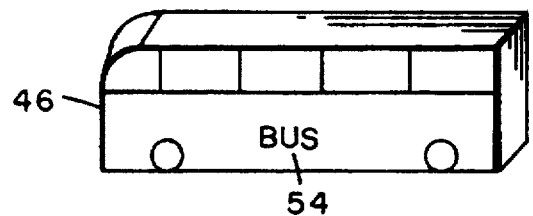
Figure 3C:
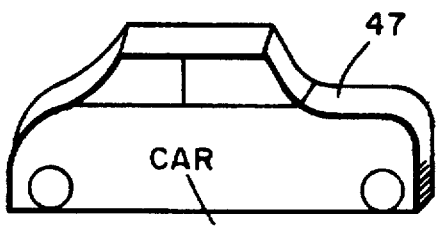
Figure 3D:
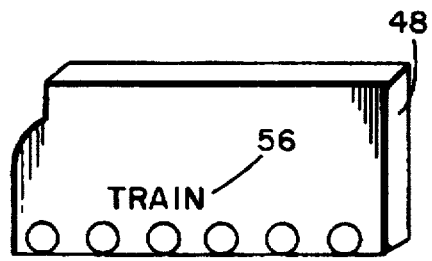
Figure 3I:
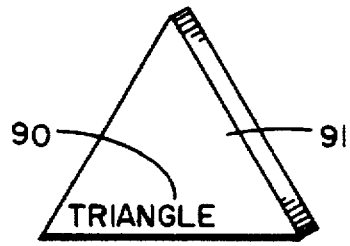
Figure 3E:
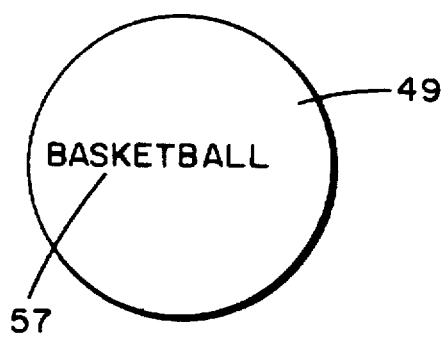
Figure 3F:
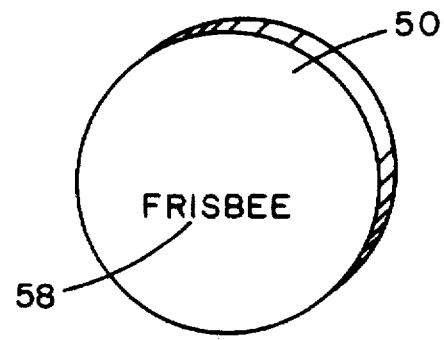
Figure 3G:
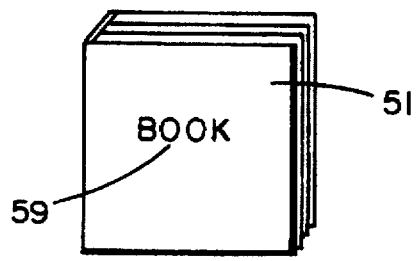
Figure 3H:
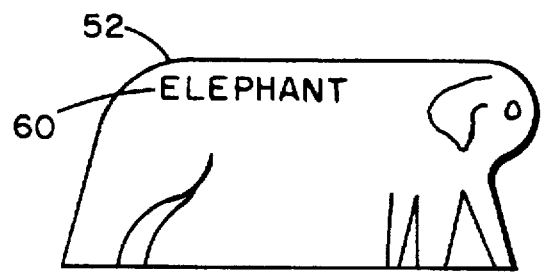

With reference now to FIGS. 1 and 2, a first preferred embodiment of the invention is illustrated. Generally speaking, the sandwich or assembled cookie like snack type food item 10 comprises one or more crispy chips 12 and/or cookies/crackers 11, one or more wafers or layers or coatings of marshmallow 13, and one or more wafers or layers of a filled food patties 14–22.

The crispy chips 12 may be of conventional ingredients and texture and are commercially available and known as potato chips or corn chips or made from rice, oats, wheat, etc. The potato chip may be made from a dough which is rolled into a thin, substantially elliptical or round or oval or square wafer 12. The crispy chip wafers 12 are baked to provide a crisp, tasty potato chip 12. Alternatively, the crispy chip wafers 12 may be formed by frying slices of raw potatoes.

The marshmallow wafer layers 13 are formulated into discrete patties or wafer shapes of one or more shapes and sizes and thickness and a desired look and taste, which may be empirically determined. For example, the marshmallow wafers 13 may be formulated to have different thickness's and/or colors to enable the consumers to select different aesthetically pleasing combinations with food wafers 14–22. The marshmallow wafers may be formulated from conventional marshmallow ingredients with selected food colorings. Separation sheets, food example, waxed paper (not shown) may be interposed between the wafers 13–22 if desired to reduce cohesion of the stacked wafers 13–22 within package 30.

A first plurality of filler layers or wafers 14 consisting of, for example, a strawberry, blueberry or grape flavored patties may be provided. The fruit flavored wafers may be formulated of various conventional food ingredients such as a strawberry like jam or past mixed with a binder starch or dough and baked to provide the desired firmness and texture. The specific ingredients and cooking methods to enable the formulation of discrete food patty like item are conventional and, therefore, will not be described in detail herein to avoid prolixity. If desired, a coating of, for example, a gluten like coating.

A second plurality of filler layers or wafers 15 consisting of, for example, slices of cheese or cheese flavored substitutes may be provided. The specific ingredients and methods to enable the formulation of such a discrete food item are conventional.

A third plurality of filler layers or wafers 16 consisting of, for example, chocolate flavored patties may be provided. The chocolate flavored wafers may be formulated of various conventional food ingredients to provide the desired firmness and texture. The specific ingredients and methods of formulation of such a discrete food patties like item are conventional and, therefore, will not be described in detail herein to avoid prolixity. If desired, a coating of, for example, a gluten or sugar or other suitable glazing like coating may be used to facilitate handling without soiling one's fingers with chocolate.

A plurality of candies 85–87 or candy like patties 17 consisting of, for example, chocolate flavored patties may be provided. The candy wafers may be formulated of various conventional food ingredients to provide the desired firmness and texture. The specific ingredients and methods of formulation of such a discrete food patties like item are conventional and, therefore, will not be described in detail herein to avoid prolixity. If desired, a coating of, for example, a gluten or sugar or other suitable glazing like coating may be used to facilitate handling without soiling one's fingers. Alternatively, a plurality of selectively shaped pieces of candies 85–88 may be provided.

A fourth plurality of filler layers or wafers 18 consisting of, for example, a variety of different jam like flavored/filled patties may be provided. The jam flavored wafers may be formulated of various conventional food ingredients to provide the desired firmness and texture. The specific ingredients and methods of formulation of such a discrete food patties like item are conventional and, therefore, will not be described in detail herein to avoid prolixity. If desired, a coating of, for example, a gluten or sugar or other suitable glazing like coating may be used to facilitate handling without soiling one's fingers with the jam like fillings.

A fifth plurality of discrete filler layers or wafers 19 consisting of, for example, a banana or pumpkin or lime or lemon flavored/filled patties may be provided. The flavored wafers may be formulated of various conventional food ingredients to provide the desired firmness and texture. The specific ingredients and methods of formulation of such a discrete food patties like item are conventional and, therefore, will not be described in detail herein to avoid prolixity. If desired, a coating of, for example, a gluten or sugar or other suitable glazing like coating may be used to facilitate handling without soiling one's fingers with the fillings.

A sixth plurality of discrete filler layers or wafers 20 consisting of, for example, a peanut butter or peanut butter crunch or peanut butter and nut mix flavored/filled patties may be provided. The flavored wafers may be formulated of various conventional food ingredients to provide the desired firmness and texture. The specific ingredients and methods of formulation of such a discrete food patties like item are conventional and, therefore, will not be described in detail herein to avoid prolixity. If desired, a coating of, for example, a gluten or sugar or other suitable glazing like coating may be used to facilitate handling without soiling one's fingers with the fillings.

A select plurality of discrete filler layers or wafers 21 consisting of, for example, a coconut butter like flavored/filled patties may be provided. The flavored wafers may be formulated of various conventional food ingredients to provide the desired firmness and texture. The specific ingredients and methods of formulation of such a discrete food patties like item are conventional and, therefore, will not be described in detail herein to avoid prolixity. If desired, a coating of, for example, a gluten or sugar or other suitable glazing like coating may be used to facilitate handling without soiling one's fingers with the fillings.

An eight plurality of discrete filler layers or wafers 22 consisting of, for example, an apple pie or so-called Dutch apple pie or apple-cinnamon like flavored/filled patties may be provided. The flavored wafers may be formulated of various conventional food ingredients to provide the desired firmness and texture. The specific ingredients and methods of formulation of such a discrete food patties like item are conventional and, therefore, will not be described in detail herein to avoid prolixity. If desired, a coating of, for example, a gluten or sugar or other suitable glazing like coating may be used to facilitate handling without soiling one's fingers with the fillings.

One or more of the above stacks or columns of discrete wafers 11–22 may be provided with a separator sheet such as waxed paper between its respective wafers to avoid sticking of two or more juxtaposed vertically stacked wafers and to facilitate consumer handling.

With reference now to FIG. 2, the wafer layers 11–22 may be selected by the consumer to formulate many different filled cookie like snacks consisting of one or more of the multiple food layers and cookie/chips into a substantially unified food package adapted for being relatively easily hand held.

The food layers or wafers 11–22 are adapted for being containerized, for example, in a compartmentalized container 30, for placement on store shelves etc. and store without contamination between the different flavored food items/patties. The container 30 contains separate compartments, for example, 31–34, for containing each separate column or stack of food items and wafers 11–22, respectively.

In accordance with the preferred embodiment of the invention, one of the compartments 17 contains an assortment of different sized and shaped candies such as is illustrated in FIGS. 3J–3M. The candied pieces are provided as a treat, and in accordance with another embodiment of the invention to also enhance cognizant skills of geometric shapes and sizes which will be more fully described below.

The food package 30 facilitates the combination of numerous different flavor wafer fillers 14–22 with marshmallow 13 and crispy chips 12 and cookies 11 for consumer assembled/prepared and selected snack food, without causing sogginess of the chips and/or cookies 11,12.

With particular reference now to FIGS. 3A–3H, an alternative embodiment of the invention is shown.

Generally speaking, this embodiment incorporates the features and advantages noted above with reference to FIGS. 1 and 2, while providing an educational and fun snack food for children.

The basic concept of this embodiment is to provide a plurality of different shaped wafers and associated food items which are designed and/or colored and/or sugar frosted coated with a word, phase and/or picture or drawing to depict a predetermined number of different items or ideas such as, for example, a house 45, a bus 46, a car 47, a train 48, a basket ball 49, a frisbee 50, a book 51, and an elephant 52, etc. Each selected wafer contains the name of the depicted item such as the word house 53 being associated with the house wafer 45, and likewise the words bus 54, car 55, train 56, basket ball 57, frisbee 58, book 59, and elephant 60 each being depicted in association with the corresponding figure and/or pictured or illustrated item 45–52, respectively. In this manner the child is encouraged and aided to learn, for example, to spell the names and words associated with various depictions of items, while also having a fun/entertaining experience with food rewards to reenforce the learning.

It should be recognized that the concept of the invention should not be limited to the specific depicted items 45–52, since they are presented for illustrative purposes only. For example, each package 30 may contain other shaped wafers to increase both the vocabulary and spelling ability of the consumer. The purpose of providing an illustration or picture or shaped item corresponding to the named item is to enable to child or illiterate adult to identify the word and spelling by recognition with the figure or picture presented by the associated wafer. Thus, the learning experience can take place not only on a cognitional level but also subliminally.

Accordingly, the strawberry wafers 14 may have printed on their surface a picture of a strawberry and the word strawberry 64 printed thereon. Likewise some or all of the other wafers such wafers 12 the word chips 62, wafers 13 the word marshmallow 63, wafers 15 the word cheese 65, wafers 16 the word chocolate 66, wafers 18 the word jam 68, wafers 19 the word banana 69, wafers 20 the phase peanut butter 70, wafers 21 the word coconut 71 and wafers 22 the word pies 72. Other words and phases and depictions as well as math symbols or problems may be employed to stimulate and entertain the consumers.

Figure 4:
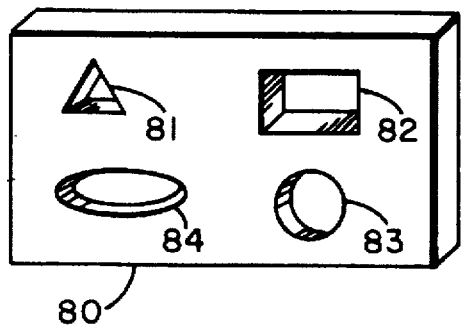
FIG. 4 is a perspective illustrations of alternative embodiment of a different sized and shaped wafer like snack food wafer item formulated in accordance with another feature of the invention.
Figure 5:
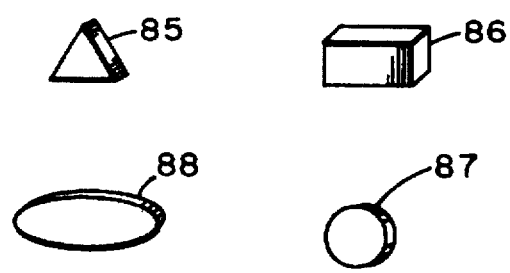
FIG. 5 is a perspective illustrations of alternative embodiment of candy insert like snack food items formulated and shaped in accordance with another feature of the invention.

With particular reference now to FIGS. 4 and 5, an alternative embodiment of the invention will now be discussed. This embodiment of the invention includes a marshmallow wafer 80 having a plurality of geometric cut-outs or holes such as a triangle 81, a square 82, a circle 83, and an oval 84 as illustrated in FIG. 4. A plurality of candies or jelly beans or other flavored items having shapes such as a triangle 85, a square 86, a circle 87 and an oval 88, each having a size and shape corresponding to the respective holes 81–84 in the marshmallow wafer 80 as illustrated in FIG. 4. The object of this embodiment is to encourage the consumer/child to recognize and associate different geometric shapes and sizes by inserting to corresponding candies 85–88 into the respective holes of wafer 80. In this manner the consumer learns the relationship between different sizes and shapes while having the fun of trying different flavored candies with marshmallow 80. Typically, this combination may be arranged/assembled with a cookie(s) 11 and/or crispy chip 12 and other wafers 13–22 such as illustrated in FIG. 1.

The term—wafer—is used throughout to mean, in addition to the word's traditional meaning, a patty or disk shaped or square shaped or other configured/shaped relatively thin discrete food item formed for easy hand manipulation, i.e., grasping with a person's fingers to facilitate the stacking of one or more such wafers on or between one or more crackers or cookies or potato chips and the like. Each wafer is formed to have a surface texture or coating or sheathing for encasing one or more encased flavored foods such as various jams, peanut butter, fruit pie like ingredients, chocolate, marshmallow, lemon flavored filling and other filler food items, and to reduce or eliminate degradation or decomposition and soiling the consumer while being held or manipulated to compile the individualized snack food sandwich.

While this invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

What is claimed is:

1. A multi-wafered snack food product being consumer selectively assembled of one or more different compilations of multilayered wafers into a sandwiched food product consisting of:

one or more discrete cookies (11);

one or more discrete marshmallow wafers (13) dimensioned and shaped to have one or more wall portions (80,81,82,83) defining one or more candy receiving holes (84,85,86,87) having predetermined configurations;

one or more discrete pieces of selected candy (90,91,92, 93) each having a predetermined shape corresponding to one or more of said candy receiving holes;

a plurality of discrete filler wafers (14–16, 18–22) each having one or more predetermined shapes and/or indicia thereon;

whereby one or more of said cookies and/or marshmallow wafers and/or filler wafers being consumer multilayered into one or more individualized snack food sandwiches, and whereby each respective piece of candy being manipulable into a similarly shaped candy receiving hole.

2. A consumer selectable multi-wafered snack food product as in claim 1, wherein:

the marshmallow wafers are dimensioned and shaped to facilitate being combined in a sandwich like arrangement with one or more of said cookies.

3. A consumer selectable multi-wafered snack food product as in claim 1, wherein:

the marshmallow wafers are dimensioned and shaped to facilitate being combined in a sandwich like arrangement with one or more of said crispy chips.

4. A consumer selectable multi-wafered snack food product as in claim 1, wherein:

one or more of said filler wafers are dimensioned and shaped to have one or more geometric configurations to provide an aesthetics assortment.

5. A consumer selectable multi-wafered snack food product as in claim 1, wherein:

one or more of said filler wafers are dimensioned and shaped to facilitate being combined in a sandwich like arrangement with one or more of said cookies.

6. A consumer selectable multi-wafered snack food product as in claim 1, including:

one or more discrete crispy chips (12).

7. A consumer selectable multi-wafered snack food product as in claim 1, wherein:

one or more of said filler wafers are dimensioned and shaped to have one or more geometric configurations.

8. A consumer selectable multi-wafered snack food product as in claim 1, wherein:

one or more of said filler wafers are dimensioned and shaped to have one or more configurations consisting of a car (47), a house (45), a bus (46), a train (48), a ball (49), an animal (52), a book (51), a toy (50).

9. A consumer selectable multi-wafered snack food product as in claim 1, wherein:

one or more of said filler wafers have indicia thereon indicative of generally recognized items and flavors consisting of the word "car" (55), "house" (53), "bus" (54), "train" (56), "ball" (57), an "elephant" (60), "book" (59), or toy shape, and "frisbee" (58), "chocolate", "strawberry", "jams", "peanut butter", "cheese", "coconut", "banana" flavors.

10. A consumer selectable multi-wafered snack food product as in claim 1, wherein:

said filler wafers are dimensioned and shaped to have one or more configurations consisting of a car (47), a house (45), a bus (46), a train (48), a ball (49), an animal (52), a book (51), a toy (50) and to have indicia on each respective filler wafer indicative of the respective configuration.

11. A process of producing an improved multilayered sandwich food product suitable for being packaged and shipped to retail stores substantially without degradation of the distinctive flavors and/or textures of the constituent components and for enabling many combinations of selected preformed wafer shaped food items, consisting of the steps of:

providing a compartmentalized box shape container;

inserting a plurality of cookies and/or crackers and/or crispy chips from the group consisting of potato chips, corn chips, rice cakes, oat crackers and wheat crackers into selected compartments within said container;

forming a plurality of selected shaped and sized wafers or disc shaped marshmallow food products each having a predetermined configuration in the form of animals or so-called silver dollars, each wafer or disc may be colored with a different food coloring to enhance the visual appearance and identity of the wafer figure and/or have surface characteristics for tactile and visual recognition;

inserting said marshmallow wafers or discs having candies in a receiving hole into selected compartment within said container;

forming a plurality of selected shaped and sized wafers and/or disc shaped intermediate filler food products selected from the group consisting of peanut butter, chocolate, coconut, jelly, jams, candy, marmalades, syrups, fruits and extracts each having a predetermined configuration in the form of animals or so-called silver dollars, each wafer or disc may be colored with a different food coloring to enhance the visual appearance and identity of the wafer figure and/or have surface characteristics for tactile and visual recognition, each filler wafer or disc is formulated and/or coated with an edible substance/coating formulated to permit and facilitate handling by the consumers to enable selective assortment and arrangement of the filler wafer(s) with one or more said marshmallow wafer(s) and/or said cookies and/or crackers;

inserting said intermediate filler food wafer products into selected compartments within said container;

providing a hermetically sealed packaging about said container.

12. A multi-wafered snack food product being consumer selectively assembled of one or more different compilations of multilayered wafers into a sandwiched food product consisting of:

one or more discrete cookies (11);

one or more filler wafers having indicia thereon comprising a predetermined word;

one or more marshmallow wafers dimensioned and shaped to have one or more wall portions (81,82,83,84) defining one or more candy receiving holes each having a predetermined configuration;

one or more discrete pieces of candy each having a predetermined shape corresponding to one or more of said candy receiving holes;

whereby each respective piece of candy being manipulable into a similarly shaped candy receiving hole, and the consumer being exposed to a learning experience including identification of shapes with the word/phase spelling associated therewith.

* * * * *